United States Patent
Batra et al.

(10) Patent No.: US 9,461,861 B2
(45) Date of Patent: Oct. 4, 2016

(54) TIME-DOMAIN WINDOWING FUNCTION

(71) Applicant: TEXAS INSTRUMENTS INCORPORATED, Dallas, TX (US)

(72) Inventors: Anuj Batra, Dallas, TX (US); Timothy Mark Schmidl, Dallas, TX (US); Il Han Kim, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 69 days.

(21) Appl. No.: 14/048,411

(22) Filed: Oct. 8, 2013

(65) Prior Publication Data

US 2014/0307810 A1    Oct. 16, 2014

Related U.S. Application Data

(60) Provisional application No. 61/810,519, filed on Apr. 10, 2013.

(51) Int. Cl.
*H04L 25/49* (2006.01)
*H04L 27/26* (2006.01)
*H04B 3/54* (2006.01)
*H04L 25/03* (2006.01)

(52) U.S. Cl.
CPC ........... *H04L 27/2634* (2013.01); *H04B 3/542* (2013.01); *H04L 25/03834* (2013.01); *H04B 2203/5433* (2013.01)

(58) Field of Classification Search
CPC ............... H04L 27/2647; H04L 2025/03414; H04L 27/2634; H04L 5/0007; H04L 25/03343; H04L 27/2628; H04L 27/2607; H04L 27/263; H04L 27/2636; H04L 25/03834; H04L 27/2627; G06F 17/142; H04B 1/7097; H04B 1/719; H04B 3/542; H04B 2203/5433; H03H 17/0289

USPC ............... 375/260, 295, 296; 370/203, 210; 332/107, 123, 159; 708/400, 403, 404; 379/406.06, 406.12, 406.13
See application file for complete search history.

(56) References Cited

U.S. PATENT DOCUMENTS

| | | | |
|---|---|---|---|
| 7,675,984 B1* | 3/2010 | Carbone | H04L 25/03834 375/254 |
| 2005/0009476 A1* | 1/2005 | Wu | H04B 7/0413 455/101 |
| 2007/0004465 A1* | 1/2007 | Papasakellariou et al. | .. 455/571 |
| 2008/0063101 A1* | 3/2008 | Cimini et al. | ................ 375/260 |
| 2009/0245406 A1* | 10/2009 | Moffatt et al. | ................ 375/261 |
| 2012/0170680 A1* | 7/2012 | Stern | ............................ 375/299 |
| 2013/0005282 A1* | 1/2013 | Zhang et al. | .............. 455/114.2 |
| 2014/0153420 A1* | 6/2014 | Garin et al. | ................... 370/252 |

OTHER PUBLICATIONS

Chang et al., "The IEEE 802.15.4g Standard for Smart Metering Utility Networks," IEEEGridComm Symposium, 2012, pp. 476-480.*
Meng et al., "Coexistence of smart utility networks and WLAN/ZigBee in smart grid," IEEEGridComm Symposium, 2012, pp. 211-216.*

* cited by examiner

*Primary Examiner* — Tesfaldet Bocure
(74) *Attorney, Agent, or Firm* — John R. Pessetto; Frank D. Cimino

(57) ABSTRACT

A smart utility network (SUN) device that includes an orthogonal frequency-division multiplexing (OFDM)-based transmitter. The OFDM-based transmitter including a signal processor to convert data from a frequency-domain to a time-domain using an inverse fast Fourier transform (IFFT) and configured to perform a time-domain windowing function based on a Hanning window on OFDM symbols.

16 Claims, 4 Drawing Sheets

US 9,461,861 B2

TIME-DOMAIN WINDOWING FUNCTION

CROSS-REFERENCE TO RELATED APPLICATION

The present application claims priority to U.S. Provisional Patent Application No. 61/810,519, filed on Apr. 10, 2013; which is hereby incorporated herein by reference.

BACKGROUND

Various areas of communication, be they Wi-Fi or long term evolution (LTE), use the orthogonal frequency division multiplexed (OFDM) modulation technique. Smart grid networks, where smart meters are measuring energy consumption and transmitting that information to central processing stations, are also moving towards OFDM-based communications. Two examples of smart grid communications are smart utility networks (SUN), which is a wireless communication technology, and power line communications (PLC), which is a wired communication technology. These communication systems are governed by various regulatory agencies that put limits on various aspects of the transmissions, including out-of-band emissions (OOB).

OFDM modulation forms information into symbols and/or packets of symbols with each symbol comprising various numbers of sub-carriers. The sub-carriers are used to transmit a bit(s) of information and each sub-carrier may be associated with a different frequency. When using OFDM modulation, a discontinuity may form at the transition from one OFDM symbol to the next. These discontinuities may increase the OOB emissions, an area highly regulated by several regulatory bodies, including the Federal Communication Commission (FCC). The FCC requires OOB emissions to be minimal.

SUMMARY

The problems noted above are solved in large part by a smart utility network (SUN) device that includes an orthogonal frequency-division multiplexing (OFDM)-based transmitter. The OFDM-based transmitter includes a signal processor to convert data from a frequency-domain to a time-domain using an inverse fast Fourier transform (IFFT) and configured to perform a time-domain windowing function based on a Hanning window on OFDM symbols.

Another solution may be a power line communication (PLC) device that includes a transmitter to transmit orthogonal frequency-division multiplexing (OFDM) symbols, and a signal processor, coupled to the transmitter, to convert data from a frequency-domain to a time-domain using an inverse fast Fourier transform (IFFT) and configured to perform a time-domain windowing function based on a Hanning window on the OFDM symbols.

And yet another solution may be a method to reduce the out-of-bound emission spectrum of an orthogonal frequency-division multiplexing (OFDM) transmitter that includes performing, by a signal processor, inverse fast Fourier transforms on a frequency-domain data stream to convert the data stream into a time-domain data stream, wherein the time-domain data stream comprises symbols, inserting, by the signal processor, a cyclic prefix onto the symbols of the time-domain data stream, adding, by the signal processor, cyclic extensions to the symbols, smoothing, by the signal processor, a transition between two adjacent symbols by performing a time-domain windowing function based on a Hanning window.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
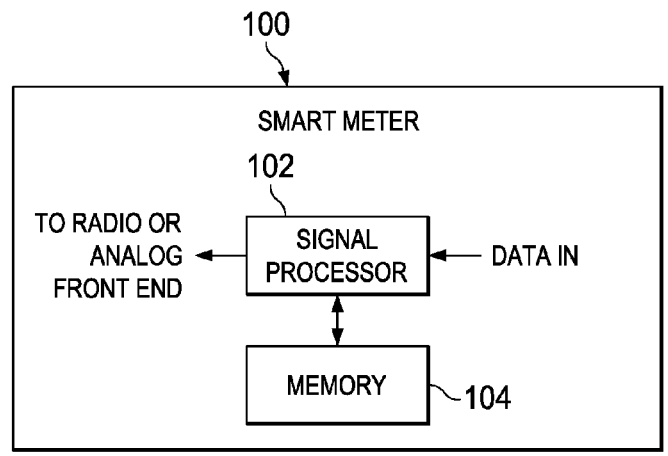
FIG. 1 is a block diagram of a smart meter 100 in accordance with various examples discussed herein.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

A smart utility network (SUN), governed by the IEEE 802.15.4g standard and specifying the use of OFDM, is a low rate (40 kbps to 1 Mbps), low power wireless technology that is specifically designed to be used in utility metering applications, such as transmitting electric, gas, or water usage data from the meter(s) on the customer premises to a data collection point operated for the utility. For example, meters may be installed at each utility consuming structure in a neighborhood or business park, and then consumption data may be sent every 15 minutes or so from a smart meter to a pole-top data collection point. The data collection point may then be connected by fiber, copper wire, or wirelessly to a central office which collects all the data for a region/neighborhood. The data may either be sent directly from each meter to the collection point, or it could hop from meter to meter until reaching the collection point.

Besides SUN devices and their associated standard, other communications protocols transmit information using an OFDM modulation techniques either via wires or wirelessly. Other protocols include Wi-Fi, which falls under the IEEE 802.11 family of standards, and power line communications (PLC), which falls under the IEEE 1901.1, 1901.2, International Telecommunication Union (ITU) G.9903 and the HomePlug standards. The current disclosure may be implemented in and applicable to devices using any of the standards mentioned in regards to OFDM modulation techniques.

OFDM encoding is conventionally implemented at the physical layer (PHY) of a network by mapping digital bits onto symbols, taking the IFFT and adding a cyclic prefix to create OFDM symbols before transmission of the signal. Since the information carried by each OFDM symbol is independent (i.e., each symbol is independently mapped without regard to adjacent symbols), there may be abrupt and discontinuous transitions between the OFDM symbols. These discontinuities may result in higher OOB emissions. An OOB emission is a signal appearing outside of the designated bandwidth of transmitted signal due to the modulation process. OOB emissions are required by various regulatory bodies to be minimal if not zero. A conventional solution to minimizing OOB emissions is a time-domain windowing technique that will smooth the transition between the OFDM symbols.

The time-domain windowing technique mixes together, or averages, two overlapping regions from two contiguous OFDM symbols to create a smooth transition from one symbol to the next. The two adjacent OFDM symbols may be cyclically extended (either before the OFDM symbol, after the OFDM symbol, or partially before and after the OFDM symbol). The cyclic extension at the beginning of an OFDM symbol may overlap with the prior OFDM symbol and the cyclic extension at the end of an OFDM symbol may overlap with the next OFDM symbol. The overlapping cyclic extensions and two adjacent OFDM symbols may then be mixed together using the time-domain windowing function. Thus, the transition between the two symbols is smoothed due to one slowly changing into the next instead of having an abrupt change as may occur without the smoothing. Another way to view the operation of the time-domain windowing function is to slowly ramp down one OFDM symbol while slowly ramping up the next OFDM symbol.

In general, a time-domain widowing function should be a monotonically increasing function that starts with an approximate zero value and ends at an approximate value of one. This monotonically increasing nature of the function is what produces the smoothing of the two OFDM symbols. In practice, two time-domain windowing functions are used when mixing the adjacent OFDM symbols. One of the two functions may be a monotonically increasing time-domain windowing function f and the other function may be a monotonically decreasing function $g=1-f$. Both functions may be of equal length, where the length refers to the number of samples used in the cyclic extensions. As such, a single function is used twice in the time-windowing of two adjacent OFDM symbols—the function itself and one minus the function.

The function f used in a conventional time-domain windowing operation may be a raised cosine function or a sine-squared function, as seen in the IEEE 802.11a and IEEE P1901.2 specifications. The raised cosine and the sine-squared functions are triginometrically equivalent and both are monotonically increasing from around zero to around one. The use of the time-domain windowing function and the sine-squared (raised cosine) functions to reduce OOB emission may be acceptable. However, there may be other functions that may offer greater OOB emission suppression.

Disclosed herein are devices and methods to reduce the OOB emission spectrum of OFDM-based transmissions by implementing a time-domain windowing function based on a Hanning function. OFDM-based devices may produce reduced OOB emissions when implementing the Hanning window due to the smoother transitions between adjacent OFDM symbols obtained. The Hanning window produces smoother transitions between adjacent OFDM symbols because in the frequency-domain, the Hanning window function rolls off more quickly than a raised cosine function.

FIG. 1 is a block diagram of a smart meter 100 in accordance with various examples discussed herein. The smart meter 100 may include a transmitter 106, which will include a signal processor 102 and a memory 104. The smart meter 100 may be part of a SUN system that implements the IEEE 802.15.4g standard. Alternatively, the smart meter 100 may be a part of a PLC system implementing either the IEEE 1901.2 standard or the ITU G.9903 standard. The signal processor 102 may be part of an OFDM-based transmitter. The signal processor 100 may receive digital data (bits and/or bytes) as input and may output OFDM symbols. The OFDM symbols may be transmitted by a radio or a radio frequency (RF) transmitter coupled to the output of the signal processor 100.

The signal processor may implement a time-domain windowing function based on a Hanning window, as discussed above. The time-domain windowing function may use the Hanning window function and one minus the Hanning window function to smooth the transitions between adjacent OFDM symbols. The smoothing of the transitions between adjacent OFDM symbols may reduce or eliminate OOB emissions by the OFDM-based transmitter implementing the signal processor 102.

The time-domain windowing function based on the Hanning window may be calculated "on the fly" in conjunction with each time-domain windowing operation performed by the signal processor 102. Alternatively, coefficients that define the time-domain windowing function based on a Hanning window may be pre-calculated and stored in the memory 104. The coefficients may then be used by the signal processor 102 when performing the time-domain windowing operations on the OFDM symbols.

For "on the fly" implementation, the coefficients may be calculated by the signal processor 102 executing software, which may be stored in the memory 104, or by an application specific integrated circuit (ASIC) designed to calculate the coefficients. Alternatively, the coefficients may be pre-calculated and stored in memory accessible by the signal processor 104 or synthesized into the gates of an ASIC. Regardless of the implementation, the time-domain windowing function based on a Hanning window may reduce the OOB emission of OFDM transmissions.

Figure 2:
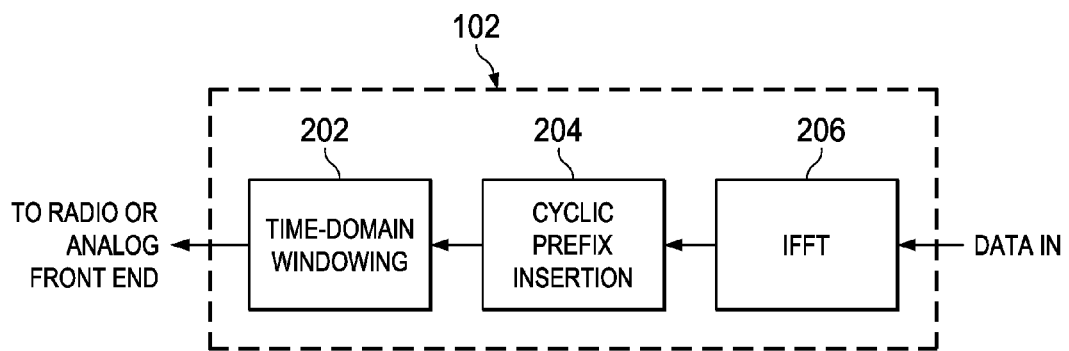
FIG. 2 is another example a signal processor 102 to implement a time-domain windowing function based on a Hanning window in accordance with various examples discussed herein.

FIG. 2 is another example a signal processor 102 to implement a time-domain windowing function based on a Hanning window in accordance with various examples discussed herein. The signal processor 102, which may be included in a PLC or SUN system, may comprise a time-domain windowing unit 202, a cyclic prefix (CP) insertion unit 204 and an inverse fast Fourier transfer (IFFT) unit 206. The IFFT unit 206 may receive the digital data input, may generate IFFT symbols as an output, and may be coupled to the CP insertion unit 204. The CP insertion unit 204 may insert cyclic prefixes into each of the IFFT symbols received from the IFFT unit 206 to generate the OFDM symbols. Alternatively or additionally, the CP insertion unit 204 may insert a cyclic suffix onto the IFF symbols or both a cyclic prefix and a cyclic suffix. The CP insertion unit 204 may be coupled to the time-domain windowing unit 202. The time-domain windowing unit 202 may insert cyclic extensions and then apply the time-domain windowing function based on the Hanning window to the OFDM symbols received from the CP insertion unit 204.

The time-domain windowing unit 202 may implement one of the following Hanning windows in the time-domain windowing function. One N-length Hanning window may be defined as:

$$f_1(n)=\frac{1}{2}[1-\cos((2\pi n)/(2(N+1)))] \text{ where } n=1,2\ldots N$$

where N is the total length in samples of the Hanning window. Another N-length Hanning window may be defined as:

$$f_2(n)=\frac{1}{2}[1-\cos((2\pi n)/(2N))] \text{ where } n=1,2\ldots N$$

where, again, N is the total length in samples of the Hanning window. The length of the Hanning window may define how many samples from the adjacent OFDM symbols are used to perform the time-domain windowing. The higher the number of samples included, the more overlap between the adjacent OFDM symbols are included in the time-domain windowing operation.

In addition, a sampling rate may also play a role in the time-domain windowing operation. The number of samples used in the windowing function depends on the transition region and the oversampling factor. For example, for a transition region of length 2 and an oversampling factor of 4, the number of samples in the windowing function will be 2×4=8. Another example, for a transition region of length 6 and an oversampling factor of 8, the number of samples in the windowing function will be 6×8=48.

As noted above, time-domain windowing uses a function that monotonically increases from a value of zero or close to zero to a value of one or close to one and a second function that monotonically decreases from and to similar values. Conventionally, the decreasing function is one minus the increasing function. Both of the Hanning windows included above satisfy the monotonically increasing from zero or close to zero to one or close to one. The two Hanning windows may also produce a rate of change, both increasing and decreasing, that is smoother and less abrupt than the rate of change for a sine-squared and a raised cosine function of a comparable window length. The smoother rate of change may produce the smoother transition between adjacent OFDM symbols resulting in less OOB emissions.

Figure 3A:
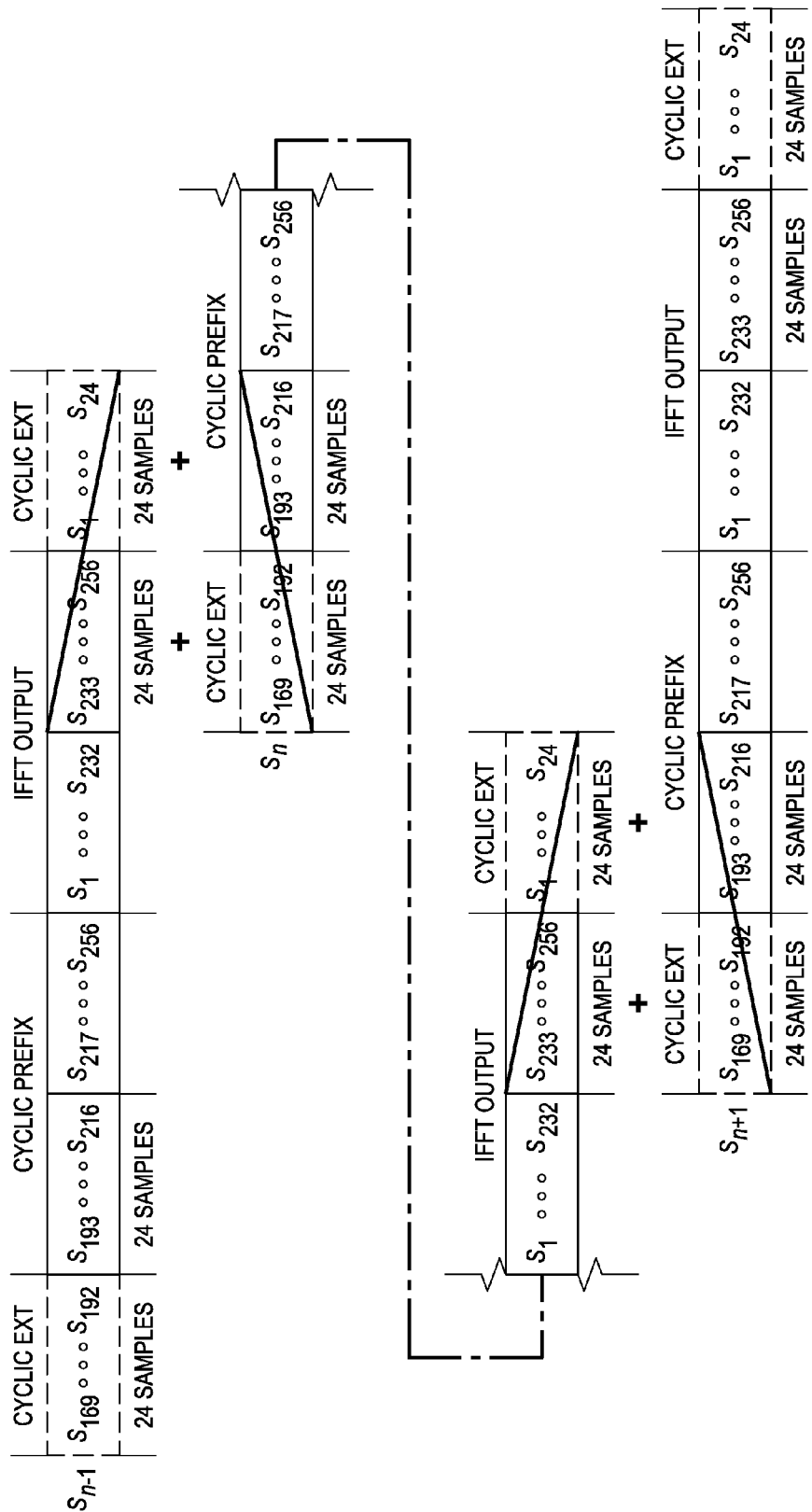
FIGS. 3A and 3B show OFDM symbols before (3A) and after (3B) application of the time-domain windowing function based on the Hanning window in accordance with various examples as discussed herein.
Figure 3B:
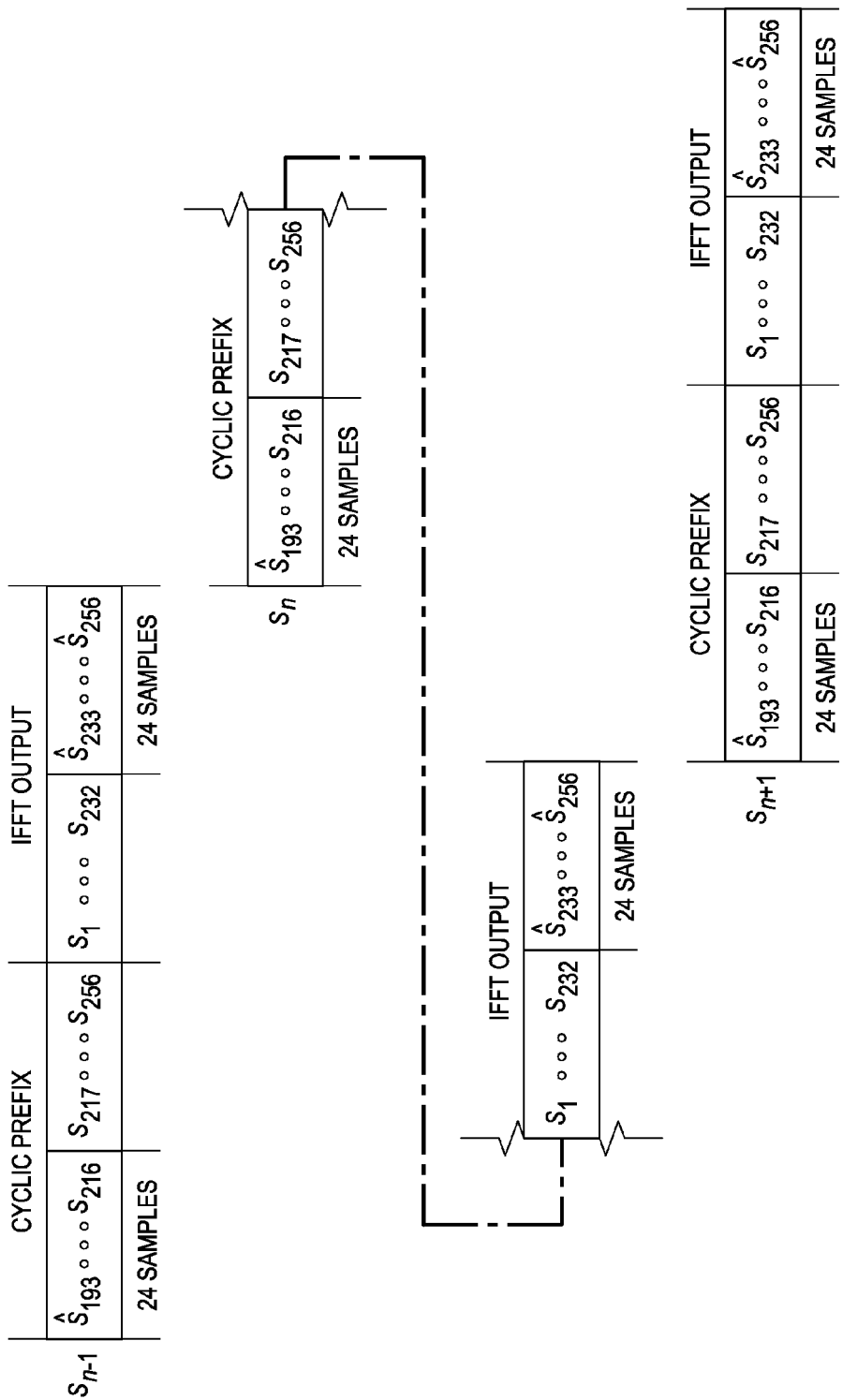

FIGS. 3A and 3B show OFDM symbols before (3A) and after (3B) application of the time-domain windowing function based on the Hanning window in accordance with various examples as discussed herein. FIG. 3A shows three adjacent OFDM symbols ($S_{n-1}$, $S_n$, and $S_{n+1}$) before the time-domain windowing operation has been performed. All three OFDM symbols have been cyclically extended at the beginning and the end by 3 samples at a Nyquist sampling rate, which results in a transition region of up to 6 samples at the Nyquist sampling rate. Alternatively, the cyclic extensions may be 24 samples at an 8 times oversampling rate, which results in a transition region of up to 48 samples at the 8 times oversampling rate. In both cases, the transition region is the same. The transitions regions may be represent the regions of the three OFDM symbols with a line through them. The plus signs represent the application of the time-domain windowing function to the three adjacent OFDM symbols.

The overlapping or transition regions from two consecutive OFDM symbols are mixed together by the time-domain windowing function using one of the two Hanning windows described above. If the Hanning window $f_1(n)$ is used as the monotonically increasing function, then g=1−f will be the monotonically decreasing function. Both f and g will be of equal length, such as 6 samples at the Nyquist rate or 48 samples at the 8 times oversampling rate. The number of samples used may be a function of the sampling rate, and the time-domain windowing function based on the Hanning window is not limited to the sample lengths and oversampling/Nyquist rate samples used herein. Other Nyquist and oversampling rates may also fall within the scope of the present disclosure, along with a change in the sample length.

In the overlapping regions or transition region, the transmitted time-domain signal may be given by:

$$\hat{S}_{n-1}(k+232)=g(k)S_{n-1}(k+232)+f(k)S_n(k+168),$$
$$k=1,2\ldots 24; \text{ and}$$

$$\hat{S}_n(k+168)=g(k)S_{n-1}(k-24)+f(k)S_n(k+168),$$
$$k=25,26\ldots 48,$$

where $\hat{S}_n$ represents the first 24 samples at the front edges of the $S_n$ OFDM symbol and $\hat{S}n-1$ represents the last 24 samples at the trailing edge of the $S_{n-1}$ OFDM symbol after the time-domain windowing operation has been performed. The time domain windowing function based on a Hanning window is applied twice to each OFDM symbols—once at its leading edge with the trailing edge of a previous OFDM symbol and once at a trailing edge with the leading edge of a subsequent OFDM symbol. As such, the time-domain windowing function may be conceptualized as the time-domain windowing unit 202 ramping down the transmission of one OFDM symbol while ramping up the transmission of a subsequent OFDM symbol. This ramping up and down transition from one OFDM symbol to an adjacent OFDM symbol reduces the discontinuities that occur between OFDM symbols, which may result in reduced OOB emissions.

FIG. 3B shows the three adjacent OFDM symbols after the time-domain windowing operation is performed. The three OFDM symbols in FIG. 3B are depicted as discrete units, but the values of a symbols trailing edge, $\hat{s}_{256}$ of $S_{n-1}$ for example, is the result of the time-domain windowing operation and may be similar in value to the value of the leading edge of the next OFDM symbol, $\hat{s}_{193}$ of $S_n$ for example. More generally, though, the last 24 samples of $S_{n-1}$ may slowly decrease and the first 24 samples of $S_n$ may slowly increase. The combination of the slow decrease of one OFDM symbol experienced by a transmitter (not shown) and the slow increase by a subsequent OFDM symbol may reduce the OOB emissions of the transmitter.

Figure 4:
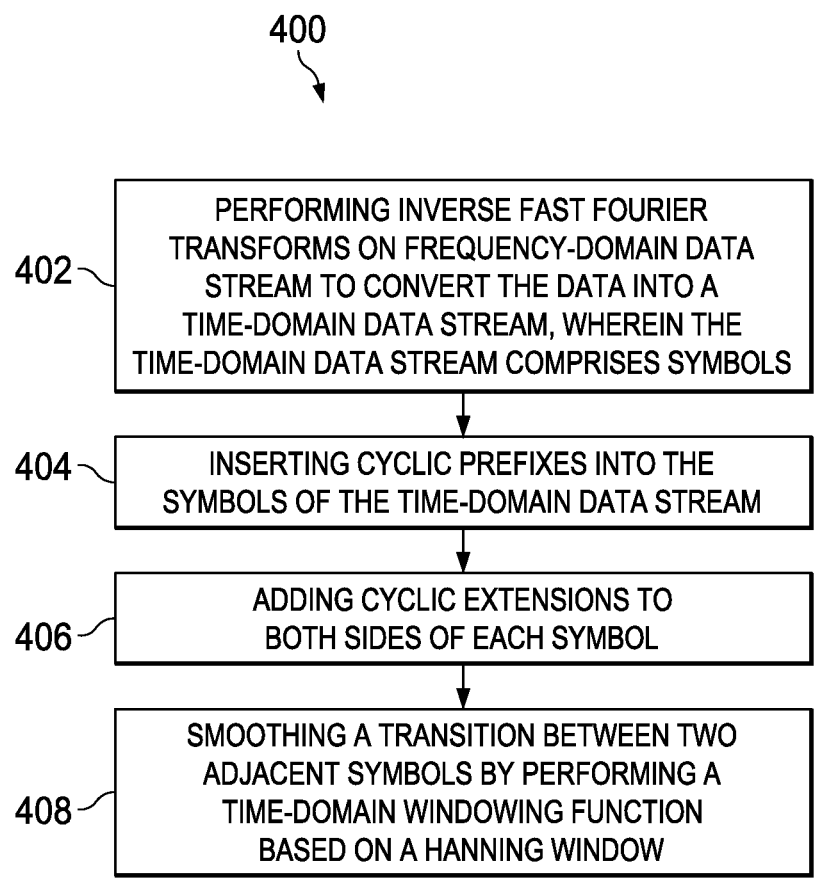
FIG. 4 shows a method flow chart for implementing the time-domain windowing function based on a Hanning window in accordance with various examples discussed herein.

FIG. 4 shows a method flow chart for implementing the time-domain windowing function based on a Hanning window in accordance with various examples discussed herein. The method 400 begins at step 402 with performing an inverse fast Fourier transform on a frequency-domain data stream to convert the data into a time-domain data stream. The time-domain data stream may be IFFT symbols and either the signal processor 102 or the IFFT unit 206 may perform the IFFT operation. The method 400 continues at step 404 with inserting the cyclic prefix onto the symbols of the time-domain data stream. Again, the insertion of the cyclic prefixes may be performed by the signal processor 102 or the cyclic prefix insertion unit 204. The method 400 then continues at step 406 with adding cyclic extensions to the symbols. The cyclic extensions may be added by the signal processor 102 or by the time-domain windowing unit 202.

The method 400 then concludes at step 408 with smoothing a transition between two adjacent symbols by performing a time-domain windowing function based on a Hanning window. The time-domain windowing function may be performed by the signal processor 102 or the time-domain windowing unit 202. In either implementation, the Hanning window implemented may be either $f_1$ or $f_2$ as described above. Additionally, the coefficients of the time-domain windowing function based on a Hanning window may be calculated "on the fly" in conjunction with performing the windowing operation or they may be pre-determined and stored in memory.

As noted throughout, the time-domain windowing function is implemented in OFDM-based transmitters to reduce OOB emissions. The implementation of these time-domain windowing function based on a Hanning window may improve OOB emissions over the use of sine-squared or raised cosine functions.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A smart utility network (SUN) device, comprising:
an orthogonal frequency-division multiplexing (OFDM)-based transmitter; and
a signal processor to convert data from a frequency-domain to a time-domain using an inverse fast Fourier transform (IFFT) and configured to perform a time-domain windowing function on cyclic extensions of OFDM symbols, wherein performing the time-domain windowing function on cyclic extensions of OFDM symbols comprises:
applying weights of a monotonically decreasing function that produces weights between 1 and 0 to a cyclic extension of an end of a first symbol, thereby generating a first transition extension component;
applying weights of a monotonically increasing function that produces weights between 0 and 1 to a cyclic extension of a beginning of a second symbol, thereby generating a second transition extension component; and
combining the first and second transition extension components, thereby generating a combined transition extension, the combined transition extension providing for a ramping down of a transmission of the first symbol and ramping up the transmission of the second symbol during a subsequent transmission of the symbols and combined transition extension.

2. The SUN device of claim 1, wherein the signal processor is configured to apply the time-domain windowing function to a window length of N-samples and is oversampled, and wherein N is a positive integer greater than one and wherein the window length is MN samples and the function is N times oversampled, and wherein M is a positive integer greater than zero.

3. The SUN device of claim 1, wherein the signal processor is an application specific integrated circuit (ASIC).

4. The SUN device of claim 3, wherein coefficients of the time-domain windowing function are stored in gates of the ASIC.

5. The SUN device of claim 1, wherein the OFDM transmitter conforms to IEEE standard 802.15.4g.

6. The smart utility network (SUN) device of claim 1 wherein the monotonically decreasing function is based on a downward sloping portion of a Hanning function and the monotonically increasing function is a complementary function of the form 1 minus the monotonically decreasing function.

7. A power line communication (PLC) device, comprising:
a transmitter to transmit orthogonal frequency-division multiplexing (OFDM) symbols; and
a signal processor, coupled to the transmitter, to convert data from a frequency-domain to a time-domain using an inverse fast Fourier transform (IFFT) and configured to perform a time-domain windowing function on cyclic extensions of the OFDM symbols, wherein the time-domain windowing on cyclic extensions of OFDM symbols comprises:
applying weights of a monotonically decreasing function that produces weights between 1 and 0 to a cyclic extension of an end of a first symbol, thereby generating a first transition extension component;
applying weights of a monotonically increasing function that produces weights between 0 and 1 to a cyclic extension of a beginning of a second symbol, thereby generating a second transition extension component; and
combining the first and second transition extension components, thereby generating a combined transition extension, the combined transition extension providing for a ramping down of a transmission of the first symbol and ramping up the transmission of the second symbol during a subsequent transmission of the symbols and combined transition extension.

8. The PLC device of claim 7, wherein the signal processor is configured to apply the time-domain windowing function on adjacent OFDM symbols.

9. The PLC device of claim 7, further comprising a memory to store coefficients of the time-domain windowing function.

10. The PLC device of claim 9, wherein the stored coefficients are used to perform the time-domain windowing function on adjacent OFDM symbols.

11. The PLC device of claim 7, wherein the signal processor is an application specific integrated circuit (ASIC).

12. The power line communication (PLC) device of claim 7 wherein the monotonically decreasing function is based on a downward sloping portion of a Hanning function and the monotonically increasing function is a complementary function of the form 1 minus the monotonically decreasing function.

13. A method to reduce the out-of-bound emission spectrum of an orthogonal frequency-division multiplexing (OFDM) transmitter, comprising:
performing, by a signal processor, inverse fast Fourier transforms on a frequency-domain data stream to convert the data stream into a time-domain data stream, wherein the time-domain data stream comprises symbols;
inserting, by the signal processor, a cyclic prefix onto the symbols of the time-domain data stream;

adding, by the signal processor, a cyclic suffix onto the symbols of the time-domain data stream;

smoothing, by the signal processor, a transition between two adjacent symbols by combining the cyclic prefix and the cyclic suffice by performing complementary time-domain windowing functions on the cyclic prefix and the cyclic suffix and combining the results of the application of the windowing functions, thereby ramping down a weight of the cyclic suffice and a ramping up of a weight of the cyclic prefix.

14. The method of claim 13, wherein the time-domain windowing functions are N samples long, wherein the time-domain windowing functions are performed at a N times oversampling rate, and wherein N is a positive integer greater than one.

15. The method of claim 14, wherein N is 8.

16. The method of claim 13 wherein the complementary time domain windowing functions are respective monotonic increasing and decreasing weighting functions based on a portion of a Hanning function that produce weights between 1 and 0 which are applied to the cyclic prefix and cyclic suffix, respectively.

* * * * *